UNITED STATES PATENT OFFICE.

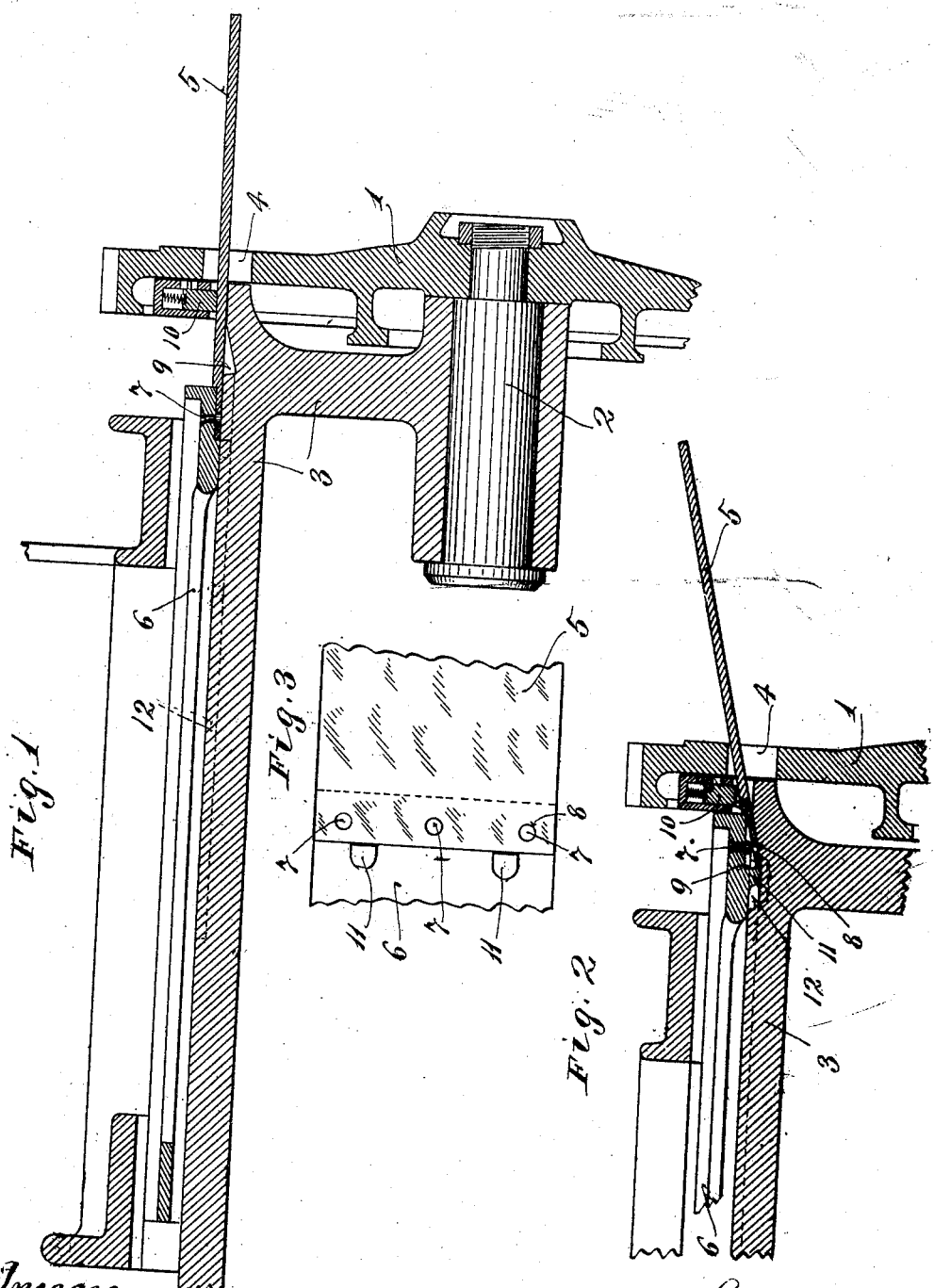

HANS PETERSEN, OF MINNEAPOLIS, MINNESOTA, ASSIGNOR TO THE LINOGRAPH MANUFACTURING COMPANY, OF MINNEAPOLIS, MINNESOTA, A CORPORATION OF MINNESOTA.

EJECTOR-BLADE FOR LINOTYPE-MACHINES.

1,025,993.

Specification of Letters Patent.   Patented May 14, 1912.

Application filed May 1, 1911. Serial No. 624,512.

*To all whom it may concern:*

Be it known that I, HANS PETERSEN, (whose post-office address is 31 Western avenue, Minneapolis, Minnesota,) a citizen of the United States, residing at Minneapolis, in the county of Hennepin and State of Minnesota, have invented certain new and useful Improvements in Ejector-Blades for Linotype-Machines; and I do hereby declare the following to be a full, clear, and exact description of the invention, such as will enable others skilled in the art to which it appertains to make and use the same.

This invention relates to linotype machines of the Mergenthaler type and similar machines which cast a type-metal slug or type-line in a mold, and has for its particular object to improve and simplify the connection between the ejector-slide and detachable blade.

Generally stated, the invention consists of the novel device and combination of devices hereinafter described and defined in the claims.

In so-called linotype machines, after the type-slug has been cast in the mold, it is ejected therefrom by an ejector-blade detachably connected to and driven by an ejector slide; and under advancing movement, this ejector blade moves through the mold and drives the type-slug outward before it. Any change in the size of type or the length of line, requires a corresponding change in the size of the mold slot or cavity, and also requires the substitution or use of an ejector blade having a corresponding change in length or thickness or in both of said dimensions. For this reason, the ejector blades have hitherto been detachably connected to their ejector-slides.

The accompanying drawings, wherein like characters indicate like parts throughout the several views, illustrate the improved connection between the ejector-slide and its ejector-blade and associated parts.

Referring to the drawings,—Figure 1 is a horizontal section taken through the mold slide, the ejector slide on its detachable blade, and mold wheel, the said parts, as illustrated, and except as hereinafter noted, being a form employed in the present commercial mercantile linotype machine, some of the said parts being broken away; Fig. 2 is a view corresponding to Fig. 1 but with more of the parts being broken away and with the ejector slide and blade in different positions from those illustrated in Fig. 1; and, Fig. 3 is a fragmentary bottom plan view, with parts broken away, illustrating the connection between the ejector slide and blade.

The mold wheel 1 is provided with a spindle 2 that is journaled in a projecting portion of the mold slide 3. This mold slide 3 affords a support for the ejector slide. The mold carried by the wheel is not shown but may be of the usual construction and arrangement.

The numeral 4 indicates a slot or opening provided in the mold wheel 1 and through which the ejector blade 5 is adapted to be removed. This ejector blade 5 is normally held in working position by being confined between the upper surface of the mold slide 3 and an under-cut end-portion of the ejector slide 6, and by engagement of short projecting studs or pins 7, on the said ejector slide, which engage with perforations or seats 8 formed in said blade. The ejector slide may be moved in the usual or any suitable way.

To detach the ejector blade 5 from the ejector slide 6, the latter must be moved to an extreme position toward the mold wheel, as shown in Fig. 2, with the ejector blade projected through the wheel slot or passage 4. When the ejector blade is thus positioned, its inner line is alined with a recess 9 formed in the mold slide 3, and then by an endwise rocking movement of the said blade, its inner end may be forced into the said recess 9 and thereby disengaged from the studs 7. This being done, the blade is separated from the slide 6 and may be removed endwise outward through the slot 4. Replacing the blade and interlocking the same to the ejector slide, it is inserted through the opening or slot 4 of the mold wheel, and under the spring pressed guide 10 carried by the said mold slide, and is then forced into the recess 9, while the ejector slide is positioned approximately as shown in Fig. 2, and is forced inward or backward until its inner edge meets with projecting stop lugs 11 formed on the said ejector slide 6. Then the blade is rocked so as to engage its perforations 8 with the studs 7. This interlocks the said ejector blade to slide and when the ejector slide is then moved backward, or toward the left with respect to Figs. 1 and 2, the inner reduced shank portion of the said ejector blade will then again be confined between the ejector slide and the mold slide. The stop lugs 11 on the ejector slide 6, as shown, are arranged to work in longitudinal grooves 12 formed in the mold slide 3.

It will be understood that under all normal operative conditions, movements of the ejector slide, of the inner or rear end of the ejector blade, will be at the rear or toward the left, with respect to the drawings, of the releasing recess 9 of the mold slide; and, hence, the ejector blade cannot be accidentally disengaged or separated from the ejector slide.

This improved connection between the ejector slide and ejector blade, while extremely simple and of very small cost, is, nevertheless, highly efficient for the purposes had in view.

What I claim is:

1. In a mechanism of the kind described, the combination with an ejector slide and a support therefor, of an ejector blade having interlocking engagement with the said slide and normally held interlocked to the said slide by the said support, the said support having a releasing notch, whereby said blade when moved into alinement with said notch may be detached from said slide by lateral movement.

2. In a mechanism of the kind described, a combination with an ejector slide and a support therefor, of an ejector blade having an end portion normally confined between said ejector slide and support, the said slide having a stud detachably engaging a seat in said blade, and the said support having a releasing notch, whereby said blade may be detached from said slide by lateral movement, when moved to an extreme or predetermined abnormal position.

3. In a mechanism of the kind described, a combination with an ejector slide and a support therefor, of an ejector blade having an end portion normally confined between said ejector slide and support, the said slide having a stud detachably engaging a seat in said blade, and the said support having a releasing notch, whereby said blade may be detached from said slide by lateral movement, when moved to an extreme or predetermined abnormal position, and the said ejector slide further having a stop lug for limiting the backward or inward movement of said blade when disconnected from the stud of said slide.

4. The combination with a mold slide, a mold wheel journaled thereto, and an ejector slide movable thereon, of an ejector blade having an end normally confined between said mold slide and ejector slide, and having stud seats at such confined end, the said mold wheel having a slot through which said ejector blade may be removed, the said ejector slide having studs normally engaging the seats in said blade, and the said mold slide having a releasing notch, adapting the said blade to be detached from the said ejector slide, by lateral movement when moved to an extreme or predetermined abnormal position.

5. The combination with a mold slide, a mold wheel journaled thereto, and an ejector slide movable thereon, of an ejector blade having an end normally confined between said mold slide and ejector slide, and having studs or seats at such confined end, the said mold wheel having a slot through which said ejector blade may be removed, the said ejector slide having studs normally engaging the seats in said blade, and the said mold slide having a releasing notch, adapting the said blade to be detached from the said ejector slide, by lateral movement, when moved to an extreme or predetermined abnormal position, and the said ejector slide having a stop lug for limiting the inward or rearward movements of said blade, when detached from the stud of said slide.

In testimony whereof I affix my signature in presence of two witnesses.

HANS PETERSEN.

Witnesses:
 BERNICE G. WHEELER,
 HARRY D. KILGORE.